Nov. 29, 1966 H. HURVITZ 3,289,126
MERCURY SWITCH EMPLOYING MAGNETIZABLE FLUID
Filed Jan. 10, 1963
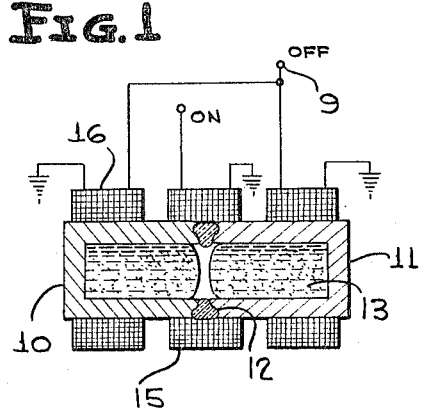
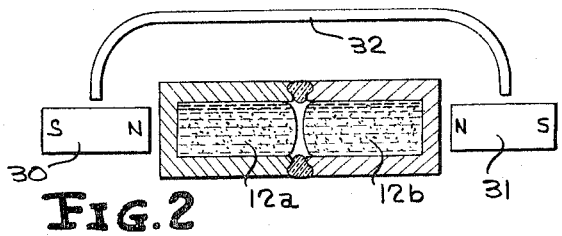
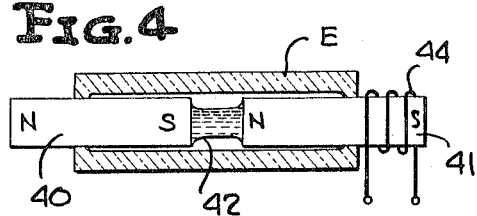
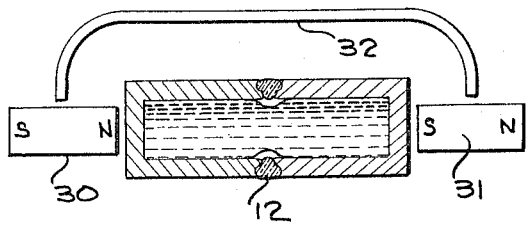
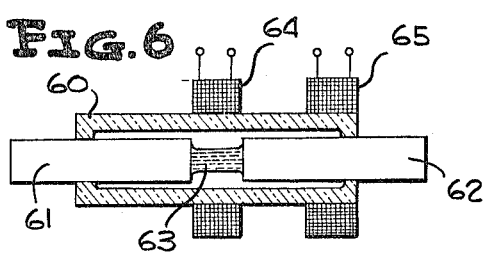
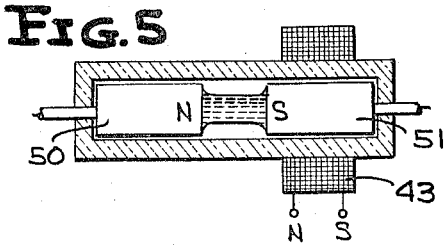
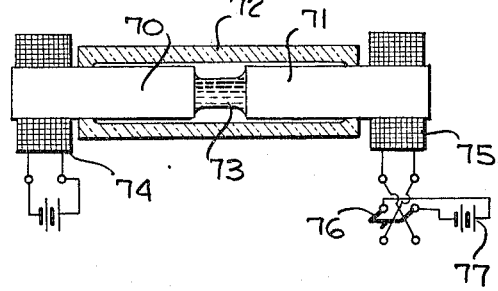
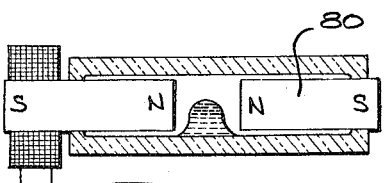
INVENTOR
HYMAN HURVITZ
BY *Hurvitz & Rose*
ATTORNEYS

United States Patent Office 3,289,126
Patented Nov. 29, 1966

3,289,126
MERCURY SWITCH EMPLOYING
MAGNETIZABLE FLUID
Hyman Hurvitz, Washington, D.C., assignor to Fifth Dimension Inc., Princeton, N.J., a corporation of New Jersey
Filed Jan. 10, 1963, Ser. No. 250,651
4 Claims. (Cl. 335—47)

The present invention relates generally to mercury switches and more particularly to mercury switches of the electromagnetically or magnetically actuated type which employ no magnetic armatures or plungers other than a quantity of magnetic mercury, i.e. a mixture of iron and mercury.

In accordance with the invention two cylindrical cups of mercury are utilized, which are mercury wettable, and which are joined by an insulating ring fabricated of mercury unwettable material. Only sufficient quantity of mercury is included in the cups to fill the cups, but not sufficient to fill the ring. Since the cups are mercury wettable and the ring is not wettable the mercury tends, due to surface tension forces, to remain in the cups and to be excluded from the ring. In this condition the switch is open. Within the mercury of the switch is placed a considerable quantity of carbonyl iron particles. The bodies of mercury in the two cups then act as magnets, when subjected to magnetic forces. When the two magnets are, at their adjacent ends, of the same polarities the mercury and carbonyl iron material in the cups repels and the switch remains open. On the other hand when the adjacent poles of the magnets are of opposite polarities the two bodies of mercury attract, come together and form a single body. In either the open or closed positions of the switch the magnetic bodies of mercury are liquid if small amounts of iron are used but may be almost solid if larger amounts are used, and accordingly the switch can be made impervious to shock and vibration, and is position insensitive.

In accordance with one embodiment of the switch three coils are used, one of which is symmetrical with the insulating ring so that when it is energized the two bodies of mercury tend to come together. The remaining two coils are on opposite sides of the first coil, and are oppositely poled, so that when they are jointly energized the two bodies of mercury form repelling magnets.

In accordance with a further embodiment of the invention, the magnetic condition of the columns of mercury are changed by means of permanent magnets, one of which has its north pole adjacent one end of one of the cups and the other of which may have either its north or its south pole adjacent the end of the other cup, so that when two north poles are adjacent the ends of the cup there is repulsion between the bodies of mercury within the cup and when a north and south pole are adjacent the ends of the cup the bodies of mercury tend to coalesce.

It is accordingly a broad object of the invention to provide novel mercury switches employing as a conductive liquid a mixture of mercury and carbonyl iron, in varying proportions, whereby the liquid itself is capable of acting as a magnetic armature.

It is another object of the invention to provide a mercury switch employing relatively a solidifiable mercury-iron mixture.

The above and still further objects, features and advantages of the present invention will become apparent upon consideration of the following detailed description of one specific embodiment thereof, especially when taken in conjunction with the accompanying drawings, wherein:

FIGURE 1 is a representation of a first embodiment of the invention; and

FIGURES 2 to 8 are representations of alternative modifications of the invention, FIGURE 2 representing a switch in open condition and FIGURE 3 representing the same switch in closed condition.

Referring now to the accompanying drawings, the reference numeral 10 denotes a cup in the form of an elongated cylinder fabricated of conductive material capable of being wet by mercury. A suitable material is platinum, although properly treated copper may also be utilized. The reference numeral 11 represents a second similar cup, the cups being arranged rim to rim, their open ends being spaced, separated and supported by a glass insulating ring 12. The quantity of mercury provided is sufficient at least substantially to fill the cups 10 and 11 but is not sufficient to include mercury within the ring 12. Since the ring 12 is not wettable by mercury while the cups 10 and 11 are wettable by mercury, the mercury will tend to remain in the cups and thereby in the normal condition of the switch, the switch will be open, if the diameter of the structure is sufficiently small.

The mercury 13 within the cups is heavily impregnated with carbonyl iron particles. Concentration of particles may be so great (80%) that the mercury acts essentially as a lubricating agent for the particles; however, a considerably smaller quantity of iron (20%) may be used to advantage. The ratio of iron to mercury is determined by desired operating characteristics and by the configuration of the cups, which may in some cases be essentially capillary tubes, and in other cases, where very large currents must be conducted may be fairly heavy long tubes, perhaps 1/8" or 1/4" in diameter and 1/2" to 1" in length. Where the tubes are capillary tubes surface tension forces will maintain the mercury in position. Where the tubes are not capillary tubes surface tension will not usually be capable of maintaining the two columns of mercury separated in the presence of shock and vibration, and the switch will not be position insensitive. The switch may be rendered insensitive however, regardless of its diameter, in accordance with the following principles.

A first coil 15 is provided, which surrounds the tubes 10 and 11, and which is symmetrical with respect to the glass ring 12. When this coil is energized the two columns of mercury act as armatures of a solenoid, and move together. Having moved together, and assuming a high ratio of iron to mercury and sufficient magnetic field, the attraction between the particles of carbonyl iron renders the armature almost solid. In this condition the switch is position insensitive and shock and vibration insensitive. Two further coils 16 and 17 are provided, the one surrounding the cup 10 and the other surrounding the cup 11. These coils are so wound that they represent magnets of opposite polarity at their adjacent ends. When they are commonly energized, as from a terminal 19, the two columns of mercury in the cups 10 and 11 constitute oppositely poled magnets which repel each other, and the switch assumes open position. Furthermore, the magnetic force of the coils may be adequate to solidify effectively the mercury iron mixture employed, so that the switch becomes insensitive to position and virtually proof against shock and vibration, in both open and closed position.

Recapitulating, the tubes or cups of FIGURE 1 may be capillary. If so, there is a choice of ratio mercury to iron. If little iron is used the magnetic mercury cannot be solidified, but the switch is position insensitive due to forces of surface tension. If the switch is of large diameter, it may be operated with a large ratio of mercury to iron, in which case it is not position insensitive. But, if position insensitivity is desired, a large proportion of iron can be employed, whereupon the mercury can be solidified, and the switch rendered position insensitive.

The sequence of operation required to open and close the switch, envisages that, for solidifiable mercury, current in the coils will build up and decay fairly slowly, so that the mercury will be liquid before it is required to move, and solid only after completion of its movement. Less field is required to move the mercury than to solidify same. It should be kept in mind that "solidify" is an extreme word, and that what actually occurs is a large increase in viscosity.

Referring to FIGURE 2 of the drawings, the structure is similar to that of FIGURE 1 except that permanent magnets are utilized instead of coils. The magnet 30 is shown as having its north pole adjacent the closed end of tube 10, as the magnet 31 is shown as having its north pole adjacent the closed end of tube 11. The south poles of the magnets 30, 31 are joined by an armature of magnetic material 32, which in a sense is not necessary, but which enhances the magnetic forces available by providing a complete magnetic path. In the condition shown in FIGURE 2 the adjacent ends of the columns of mercury 12a, 12b assumed to contain carbonyl iron, constitute oppositely poled magnets which repel each other and maintain the switch open. By reversing the position of one of the magnets as 31, illustrated in FIGURE 3 of the drawings, the magnetic field becomes continuous in the same direction through the magnets 30, 31, the armature 32 and the mass of mercury-iron 12a, 12b, whereupon the two columns of mercury coalesce and if the magnets are of sufficient strength and sufficient iron is present become highly viscous and almost solid.

When the switch is normally closed and energy for opening the switch is applied to the coils, or when the coils 16 and 17 are energized, the coil 15 being de-energized (FIGURE 1), or in the system of FIGURES 2 and 3, when the orientation of the magnet 31 is reversed, it can always be assumed that the magnetic liquid 12a, 12b will separate at the glass ring 15, because there is the weakest position along the total column of mercury. At all other positions the mercury tends to hold to the cups by virtue of surface tension.

Referring now to FIGURE 4 of the accompanying drawings there is shown a pair of magnetic electrodes 40, 41, extending into a vitreous envelope E. The electrodes 40, 41 may be relatively elongated and may have their ends adjoining. The adjoining ends are both of the same polarity, i.e., both north or both south poles. Between the electrodes is placed a small quantity of mercury 42, impregnated with iron, the quantity of liquid being insufficient to bridge the gap between the electrodes fully. Since the mercury impregnated with iron is a magnetic material it will be attracted to the two adjacent similar poles and will adhere thereto, leaving a gap between the poles and the adherent mercury or magnetic fluid. Upon energization of the coil 44, wound about one of the magnets 40 or 41, that magnet may have its polarity reversed so that the magnetic poles adjacent to the magnetic fluid are north and south. When this condition obtains the magnetic fluid will bridge the two electrodes, forming a closed circuit for the electrodes.

In the system of FIGURE 5, the electrodes 50, 51 are similar to the magnetic electrodes of FIGURE 4, but in the normal condition differently poled ends of the electrodes are adjacent so that the electrodes are normally bridged by the magnetic fluid. Upon energizing the coil 43, which surrounds one of the magnets, that magnet has its south pole changed to a north pole, whereupon the magnetic fluid gathers on the two adjacent ends of the electrodes and breaks the circuit therebetween.

In FIGURE 6 a vitreous envelope 60 is provided within which extend two electrodes 61, 62, which are non-magnetic. A globule of magnetic mercury 63 is provided, which is of sufficient size that when it is located symmetrically of the ends of the electrodes it forms a complete bridge therewith, and the vitreous envelope is of sufficient size that when the mass of magnetic fluid is withdrawn to one side or the other the connection between the electrodes is broken. Two coils 64, 65 are provided, one of which, 64, is symmetrical with respect to the gap between the poles, so that when energized it draws the magnetic fluid centrally of itself and therefore in bridging relation to the electrodes. The other coil, 65, is so located that when the mass of magnetic material tends to lie centrally thereof it unbridges the electrodes.

In the system of FIGURE 7 two magnetic electrodes 70, 71, are provided which are separated at their ends and the ends are enclosed in a vitreous envelope 72. Located between the ends is a small quantity of magnetic fluid, 73, comprised of mercury and iron. A coil 74 surrounds one end of one of the electrodes, 70, polarizing that electrode magnetically. The other electrode 71 also has a coil 75 surrounding one of its ends, but this coil 75 may be subjected to current of two polarities selectively by means of reversing switch, 76, from the battery 77. Accordingly, the latter electrode may have either a north or a south pole adjacent to the end of the other electrode, and depending on whether the two electrodes have the same or opposite polarities at their adjacent ends, they will be unbridged or bridged. Obviously, since the electrode 70 is magnetizable by means of the coil, 74, but the coil is always of the same magnetic polarity, it may be replaced by a permanent magnet 80 is in FIGURE 8.

In each of FIGURES 2–8 inclusive, the envelopes may be capillary, or of large dimension, and the ratio of mercury to iron may be large or small. If large the switch armature is essentially always liquid, but if small is solidifiable, or subject to an enormous increase in viscosity. If capillary, forces of surface tension are important. If large, forces of surface tension are relatively unimportant.

The problem of assuring that the magnetic fluid, i.e., mercury plus iron, has completed its motion before solidifying is not a problem in a small switch, since the time required to move the mercury is small, and the energizing coils have considerable inductance, and thus delay build-up of current in the coils. For large switches, a delay circuit may be required, i.e., current in the actuating coils may build up in two steps the first adequate only to move the armature and of sufficient duration to complete the motion, and the second adequate to increase the viscosity of the liquid to the required degree. R.C. delay networks, delay relays, and the like may be employed.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A mercury switch, comprising a first elongated cylinder of capillary diameter having an open end, a second cylinder, said cylinders being mercury wettable, an insulating ring joining said cylinders at said open end, said ring being fabricated of mercury unwettable material, a quantity of mercury in said cylinders, said quantity being such that said mercury can be separated into two bodies by the capillary action of said cylinders a sufficient quantity of solid magnetic particles in said mercury to form a magnetic fluid and magnetic means for moving said magnetic fluid into and out of bridging relation to said cylinders.

2. A switch comprising a first magnetic electrode having a pole of one polarity, a second magnetic electrode having an end adjoining said pole, at least said first electrode being a permanent magnet, a cylinder of capillary diameter having said first and second electrodes disposed at the opposite ends thereof, said cylinder comprising means for electrically insulating said first and second electrodes, a fluid mass of mercury-iron mixture between said pole and said end disposed within said cylinder and maintainable in too separate bodies in spaced relation therein, at least one of said bodies being retained in said cylinder by the capillary action thereof, and means for at will magnetizing said second magnetic electrode to provide a pole of polarity opposite said first polarity at said end.

3. A mercury switch comprising
a cylindrical first cup of capillary diameter having a rim,
a second cylindrical cup of capillary diameter having a rim,
said cups being electrically conductive,
an insulating ring joining said rims,
said cups and said ring defining a volume,
a quantity of conductive fluid sufficiently less than said volume such that said fluid can be separated into two bodies by the capillary action of said cups;
a sufficient quantity of magnetic particles in said conductive liquid to form a magnetic liquid, and
magnetic means for moving said magnetic liquid bodies into and out of bridging relation to said ring.

4. A mercury switch comprising
an elongated cylinder of capillary diameter having an open end,
an electrode,
said cylinder and said electrode being mercury wettable,
an insulating ring joining said electrode and said cylinder at said open end,
said ring being fabricated of mercury unwettable material,
a quantity of mercury in said cylinder having a sufficient quantity of magnetic particles therein to form a magnetic fluid, the magnetic fluid contained in said cylinder being of such an amount that said fluid is retained in said cylinder spaced from said electrode by the capillary action of said cylinder, and
magnetic means for distorting said magnetic fluid into and out of contact relation to said electrode while said magnetic fluid is retained in said cylinder.

References Cited by the Examiner
UNITED STATES PATENTS

| | | | |
|---|---|---|---|
| 1,935,710 | 11/1933 | Hatay | 200—112 |
| 1,950,178 | 3/1934 | Hunciker | 200—112 |
| 2,015,156 | 9/1935 | Richmond | 200—87 |
| 2,132,921 | 10/1938 | Bear | 200—152 |
| 2,149,782 | 3/1939 | Lucas | 75—169 |
| 2,668,884 | 2/1954 | Jacobs | 200—87 X |
| 2,859,297 | 11/1958 | Reynolds | 200—87 |
| 3,130,044 | 4/1964 | Flindt | 75—169 |
| 3,144,533 | 8/1964 | Donath | 200—112 |

ROBERT K. SCHAEFER, *Primary Examiner.*
KATHLEEN H. CLAFFY, W. C. GARVERT,
*Assistant Examiners.*